US006449677B1

(12) United States Patent
Olarig et al.

(10) Patent No.: US 6,449,677 B1
(45) Date of Patent: Sep. 10, 2002

(54) METHOD AND APPARATUS FOR MULTIPLEXING AND DEMULTIPLEXING ADDRESSES OF REGISTERED PERIPHERAL INTERCONNECT APPARATUS

(75) Inventors: Sompong Paul Olarig, Cypress; Thomas R. Seeman, Tomball; Kenneth Jansen, Spring; Dwight D. Riley, Houston, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/266,356

(22) Filed: Mar. 11, 1999

Related U.S. Application Data

(63) Continuation-in-part of application No. 09/148,042, filed on Sep. 3, 1998, now Pat. No. 6,266,731.

(51) Int. Cl.[7] .............................................. G06F 13/38
(52) U.S. Cl. ........................ 710/305; 710/307; 710/314; 710/315; 710/309
(58) Field of Search ............................. 710/126–131, 710/101, 107, 113, 62, 64, 305–307, 314, 315, 300, 301, 309

(56) References Cited

U.S. PATENT DOCUMENTS

| | | | | |
|---|---|---|---|---|
| 5,734,850 A | * | 3/1998 | Kenny et al. | 710/129 |
| 5,751,975 A | * | 5/1998 | Gillespie et al. | 710/126 |
| 5,867,645 A | * | 2/1999 | Olarig | 714/48 |
| 5,937,173 A | * | 8/1999 | Olarig et al. | 710/126 |
| 5,978,869 A | * | 11/1999 | Guthrie et al. | 710/60 |
| 6,006,291 A | * | 12/1999 | Rasmussen et al. | 710/38 |

* cited by examiner

Primary Examiner—Peter Wong
Assistant Examiner—Raymond N Phan
(74) Attorney, Agent, or Firm—Conley, Rose & Tayon, P.C.

(57) ABSTRACT

A high speed connection apparatus, method, and system is provided for peripheral components on digital computer systems. The peripheral component interconnect (PCI) specification is used as a baseline for an extended set of commands and attributes. The extended command and the attribute are issued on the bus during the clock cycle immediately after the clock cycle when the initial command was issued. The extended commands and attributes utilize the standard pin connections of conventional PCI devices and buses making the present invention backward-compatible with existing (conventional) PCI devices and legacy computer systems. Alternate embodiments of the present invention utilize a side-band address port (SBA port) to enable multiple targets to receive the same set of data. The conventional PCI command encoding is modified and the extended command is used to qualify the type of transaction and the attributes being used by the initiator of the transaction. Some extended command encodings are reserved but can be assigned in the future to new extended commands that will behave in a predictable manner with current devices.

35 Claims, 15 Drawing Sheets

METHOD AND APPARATUS FOR MULTIPLEXING AND DEMULTIPLEXING ADDRESSES OF REGISTERED PERIPHERAL INTERCONNECT APPARATUS

CROSS REFERENCE TO RELATED APPLICATION

This patent application is a continuation-in-part application to U.S. patent application Ser. No. 09/148,042 filed on Sep. 3, 1998 now U.S. Pat. No. 6,266,731 entitled "HIGH SPEED PERIPHERAL INTERCONNECT APPARATUS, METHOD AND SYSTEM" by Dwight D. Riley and Christopher J. Pettey. This patent application is also related to commonly owned U.S. patent application Ser. No. 09/036,634, filed on Mar. 6, 1998, entitled "REGISTERED PCI" by Dwight D. Riley and Christopher J. Pettey; and Ser. No. 09/160,280 filed on Sep. 24, 1998, entitled "APPARATUS, METHOD AND SYSTEM FOR REGISTERED PERIPHERAL COMPONENT INTERCONNECT BUS USING ACCELERATED GRAPHICS PORT LOGIC CIRCUITS" by Sompong Paul Olarig, Dwight D. Riley, and Ronald T. Horan. All of these references are hereby incorporated by reference for all purposes.

BACKGROUND OF THE INVENTION

1. Field of the Invention

The present invention relates to computer systems using a bus bridge(s) to interface a central processor(s), memory and computer peripherals together, and more particularly, in utilizing a registered peripheral component interconnect bus, logic circuits therefor and signal protocols thereof.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("e-mail"), document databases, video teleconferencing, whiteboarding, integrated enterprise calendar, virtual engineering design and the like. Multiple network servers may also be interconnected by local area networks ("LAN") and wide area networks ("WAN").

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Compaq Computer Corporation, Cyrix, IBM and Motorola. These sophisticated microprocessors have, in turn, made possible running more complex application programs that require higher speed data transfer rates between the central processor(s), main system memory and the computer peripherals.

Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; the disclosures of which are hereby incorporated by reference. These PCI specifications are available from the PCI Special Interest Group, 2575 NE Kathryn Street, Suite 17, Hillsboro, Oreg. 97124.

The PCI version 2.1 Specification allows for a 33 MHz or 66 MHz, 32 bit PCI bus; and a 33 MHz or 66 MHz, 64 bit PCI bus. The 33 MHz, 32 bit PCI is capable of up to 133 megabytes per second ("MB/s") peak and 50 MB/s typical; and the 66 MHz, 32 bit PCI bus, as well as the 33 MHz 64 bit PCI bus, are capable of up to 266 MB/s peak. The PCI version 2.1 Specification, however, only allows two PCI device cards (two PCI connectors) on a 66 MHz PCI bus because of timing constraints such as clock skew, propagation delay, input setup time and valid output delay. Typically, the 66 MHz PCI version 2.1 Specification requires the sourcing agent to use a late-arriving signal with a setup time of only 3 nanoseconds ("ns") to determine whether to keep the same data on the bus or advance to the next data, with a 6 ns maximum output delay. Current state of the art Application Specific Integrated Circuits ("ASIC") using 0.5 micron technology have difficulty meeting the aforementioned timing requirements. Even using the newer and more expensive 0.35 micron ASIC technology may be marginal in achieving the timing requirements for the 66 MHz PCI bus.

Since the introduction of the 66 MHz timing parameters of the PCI Specification in 1994, bandwidth requirements of peripheral devices have steadily grown. Devices are beginning to appear on the market that support either a 64-bit bus, 66 MHz clock frequency or both, with peak bandwidth capabilities up to 533 Mbytes/s. Because faster I/O technologies such as Gigabit Ethernet and Fiberchannel are on the horizon, faster system-interconnect buses will be required in the future.

When an industry outgrows a widely accepted standard, that industry must decide whether to replace the standard or to enhance it. Since the release of the first PCI Specification in 1992, the PCI bus has become ubiquitous in the consumer, workstation, and server markets. Its success has been so great that other markets such as industrial controls, telecommunications, and high-reliability systems have leveraged the specification and the wide availability of devices into specialty applications. Clearly, the preferred approach to moving beyond today's PCI Local Bus Specification is to enhance it.

What is needed is an apparatus, method, and system for a personal computer that provides increased data throughput between the personal computer system central processing unit(s), memory and peripherals that can operate at speeds significantly higher than today's PCI Specification allows. In addition, the present invention shall still be compatible with and be able to operate at conventional PCI speeds and modes when installed in conventional computer systems or when interfacing with a conventional PCI device(s) or card(s).

SUMMARY OF THE INVENTION

The present invention overcomes the above-identified problems as well as other shortcomings and deficiencies of existing technologies by providing in a computer system a registered peripheral component interconnect bus, logic circuits therefor and signal protocols thereof.

The present invention includes a preferred embodiment having revised read and write transaction protocols that add an attribute phase immediately after the standard PCI address phase to the transaction. The additional phase enables the inclusion of an extended set of commands. The inclusion of an attribute phase with an extended command set allows for maximum backward compatibility while still allowing for faster transfer rates.

A first alternate embodiment of the present invention adds a side-band address port to the PCI-X bus to enable devices to enqueue multiple requests onto the PCI-X bus. By using the side-band address port, addresses can be separated (i.e., utilize separate pins) from the data pins.

A second alternate embodiment of the present invention utilizes a multi-cast bus consisting of one command/control signal line and one or more data lines for multiplexed command/data/request signals. The multicast bus of the second embodiment enables a second PCI-X devices to receive data targeted for a first PCI-X device without having to send the same data twice over the bus. Thus, the second embodiment facilitates redundant arrays of input/output devices (RAID).

A third alternate embodiment capitalizes on the byte count transaction protocol of the PCI-X specification. By using the byte-count information, the memory controller of this embodiment can schedule the next subsequent memory transactions without waiting for the next multiple PCI-X read requests. The memory controller can issue several internal memory requests to several memory ports, if available, without waiting for the next ADS# or PCI-X read transactions. Because these addresses are sequential, the memory controller can take advantage of "page hit" cycles, and/or pipeline the memory cycles to further reduce the memory latencies.

A fourth alternate embodiment enables PCI-X devices to perform pipelined bus transactions. This is accomplished by interleaving the pipelined transaction with PCI-X protocol transactions on the PCI-X bus. The pipelined transactions, however, are limited only to memory read and write bus operations targeted at the main memory.

Additional embodiments will be clear to those skilled in the art upon reference to the detailed description and accompanying drawings.

BRIEF DESCRIPTION OF THE DRAWINGS

FIG. 4a is a schematic timing diagram of a byte-count count read operation of the computer system of FIG. 3a;

DETAILED DESCRIPTION OF THE PREFERRED EMBODIMENTS

Figure 1:
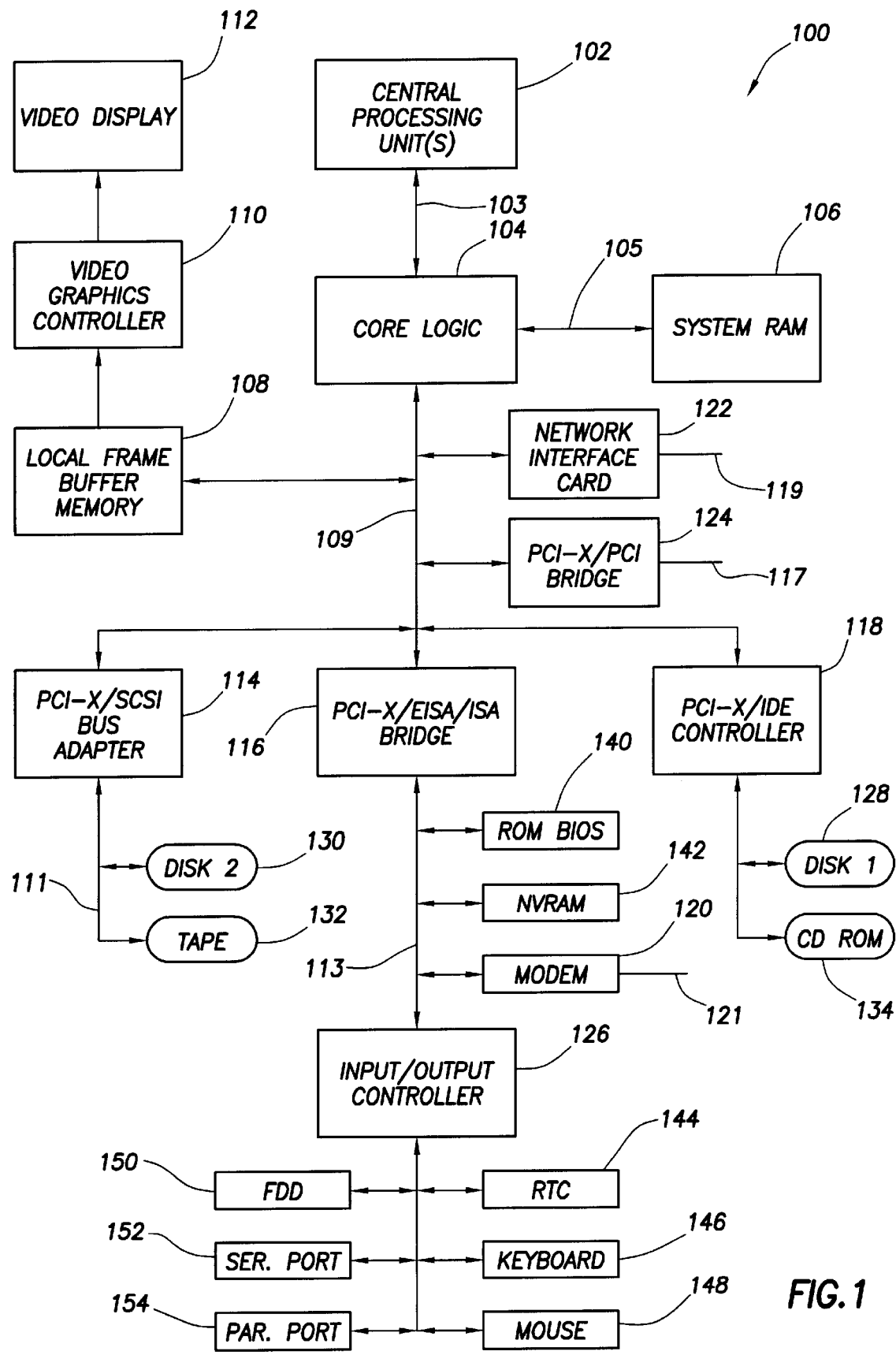
FIG. 1 is a schematic block diagram of a computer system of the present invention.

The present invention is an apparatus, method and system for providing, in several embodiments, a computer system, a registered peripheral component interconnect (hereinafter "Registered PCI" or "PCI-X") bus(es), logic circuits therefor and signal protocols thereof.

For illustrative purposes, the preferred embodiments of the present invention are described hereinafter for computer systems utilizing the Intel x86 microprocessor architecture and certain terms and references will be specific to that processor platform. PCI-X however, is hardware independent and may be utilized with any host computer designed for this interface standard. It will be appreciated by those skilled in the art of computer systems that the present invention may be adapted and applied to any computer platform utilizing the PCI-X interface standard. Moreover, some embodiments can be adapted and applied to non-PCI-X computer systems and/or computer systems utilizing non-Intel central processing units and memory controllers. Referring to the drawings, the details of preferred embodiments of the present invention are schematically illustrated. Like elements in the drawings will be represented by like numbers, and similar elements will be represented by like numbers with a different lower case letter suffix.

Referring to FIG. 1, a schematic block diagram of a computer system according to the present invention is illustrated. The computer system is generally indicated by the numeral 100 and comprises a central processing unit(s) ("CPU") 102, core logic 104, system random access memory ("RAM") 106, a video graphics controller 110, a local frame buffer 108, a video display 112, a PCI-X/SCSI bus adapter 114, a PCI-X/EISA/ISA bridge 116, a PCI-X/IDE controller 118, and, optionally, a network interface card ("NIC") 122. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU(s) 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a PCI-X bus 109. More than one PCI-X bus is contemplated herein as well as PCI-X-to-PCI bridge 124 leading to a PCI bus 117, and is within the scope and intent of the present invention. The local frame buffer 108 is connected between the video graphics controller 110 and the PCI-X bus 109. The PCI-X/SCSI bus adapter 114, PCI-X/EISA/ISA bridge 116, PCI-X/IDE controller 118 and the NIC 122 are connected to the PCI-X bus 109. Some of the PCI-X devices, such as the video controller 110 and NIC 122, may plug into PCI or PCI-X connectors on the computer system 100 motherboard (see FIG. 2).

Hard disk 130 and tape drive 132 are connected to the PCI-X/SCSI bus adapter 114 through a SCSI bus 111. The NIC 122 may be connected to a local area network 119. The PCI-X/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real-time clock (RTC) 144, mouse 148, floppy disk drive ("FDD") 150, serial port 152, and parallel port 154. The EISA/ISA bus 113 is a slower information bus than the PCI-X bus 109, but it costs less to interface with the EISA/ISA bus 113.

When the computer system 100 is first turned on, start-up information stored in the ROM BIOS 140 is used to begin operation thereof. Basic setup instructions are stored in the ROM BIOS 140 so that the computer system 100 can load more complex operating system software from a memory storage device such as the disk 130. Before the operating system software can be loaded, however, certain hardware in the computer system 100 shall be configured to properly transfer information from the disk 130 to the CPU 102. In the computer system 100 illustrated in FIG. 1, the PCI-X/SCSI bus adapter 114 shall be configured to respond to commands from the CPU 102 over the PCI-X bus 109 and transfer information from the disk 130 to the CPU 102 via buses 109 and 103. The PCI-X/SCSI bus adapter 114 is a PCI-X device and remains platform independent. Therefore, separate hardware independent commands are used to setup and control any PCI-X device in the computer system 100. These hardware independent commands, however, are located in a PCI-X BIOS contained in the computer system ROM BIOS 140. The PCI-X BIOS is firmware that is hardware specific but meets the general PCI specification that is available from the PCI Special Interest Group, 2575 NE Kathryn Street #17, Hillsboro, Oreg. 97124, which is incorporated by reference herein. Plug and play, and PCI devices (both PCI and PCI-X) in the computer system 100 are detected and configured when a system configuration program is executed. The results of the plug and play, and PCI-X device configurations are stored in the NVRAM 142 for later use by the startup programs in the ROM BIOS 140 and PCI BIOS which configure the necessary computer system 100 devices during startup. Also during startup a "built-in-self-test" (BIST) may do diagnostic testing of components, such as PCI-X devices, in the computer system 100.

Figure 2:
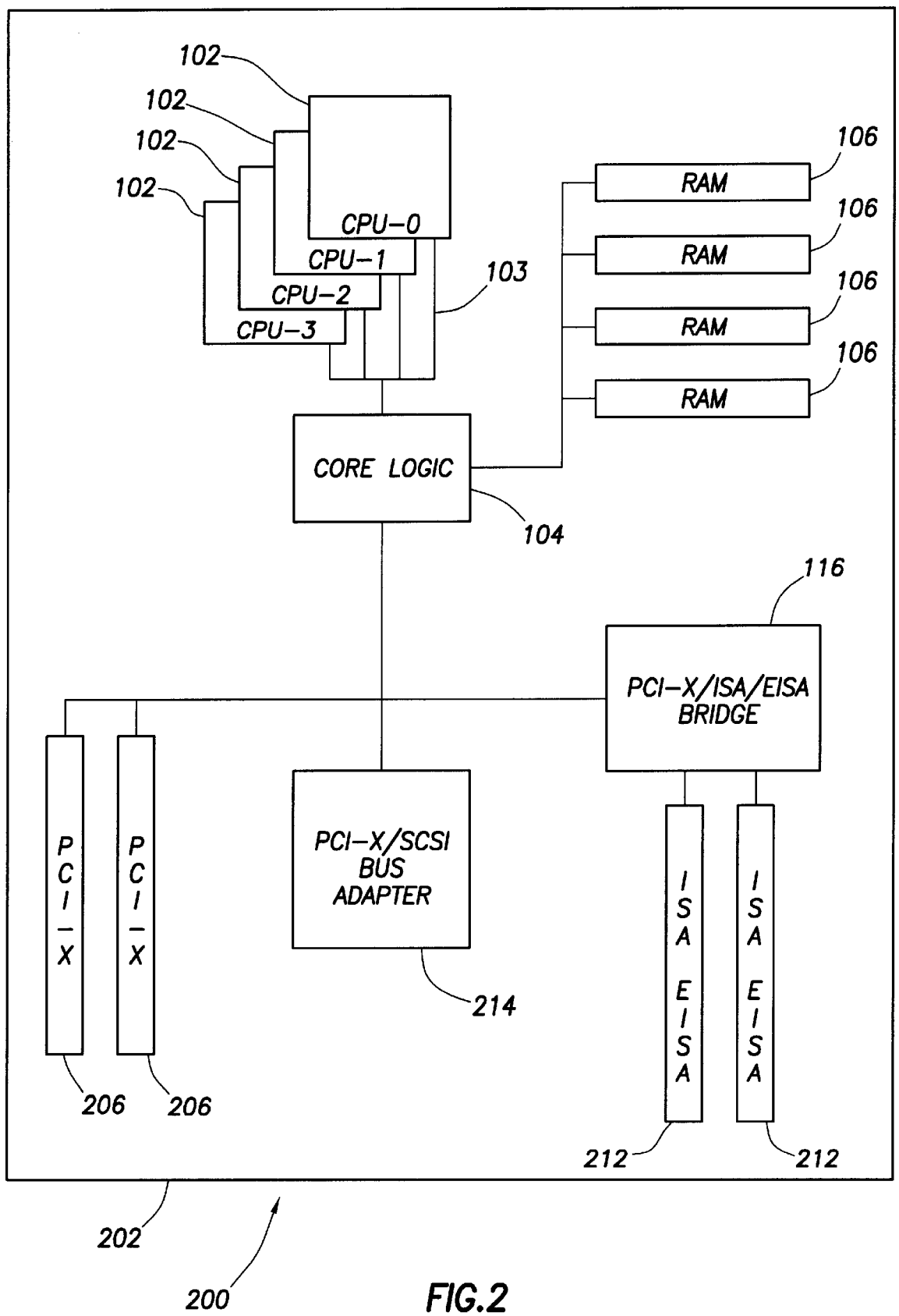
FIG. 2 is a schematic block diagram in plan view of a printed circuit motherboard of the computer system of FIG. 1.

Referring now to FIG. 2, a schematic diagram of a computer system motherboard according to FIG. 1 is illustrated in plan view. The computer system motherboard 200 comprises printed circuit board 202, on which components and connectors are mounted thereto. The printed circuit board 202 comprises conductive wiring that is printed directly onto the printed circuit board 202. The conductive wiring is used to interconnect the components and connectors thereon. The conductive printed wiring (illustrated as buses 103, 105 and 109) may be arranged into signal buses having controlled impedance characteristics. Illustrated on the printed circuit board are the core logic 104, CPU(s) 102, system memory (RAM) 106, embedded PCI-X/ISA/EISA bridge 116, ISA/EISA connectors 212, embedded PCI-X/SCSI bus adapter 114, and PCI connectors 206a, 206b. The motherboard 200 may be assembled into a case with a power supply, disk drives, etc., (not illustrated) which comprise the computer system 100 of FIG. 1.

A. The Preferred Embodiment for Byte-Count Transactions

According to the present invention, basic byte-count write and byte-count read transactions are described hereinbelow. Byte-count transactions transfer data on one or more data phases. Byte-count transactions use a byte-count extended command and include the byte count for the remainder of the sequence in the byte count field of the attributes. In the preferred embodiment of the present invention, byte-count transactions are permitted to address only prefetchable and non-prefetchable memory locations. Transactions using commands other than memory commands are not permitted to use a byte-count extended command. However, alternate embodiments of the present invention can expand the use of extended command and encompass other transactions besides memory commands without departing from the scope and spirit of the present invention. All figures illustrate a 64-bit AD bus and 8-bit C/BE# bus operating on a sequential series of clock cycles. REQ64# and ACK64# are not illustrated to aid in readability, however, it is contemplated and within the scope of the present invention that REQ64# is asserted by the initiator with FRAME# assertion and ACK64# is asserted by the target with DEVSEL# assertion. See Section I. (D)(6), Bus Width Rules of U.S. patent application Ser. No. 09/148,042, filed on Sep. 3, 1998, previously incorporated herein, for more details on the REQ64# and ACK64# assertions. It should be noted that, while the preferred embodiment of the present invention utilizes a 64-bit bus, a 32-bit or smaller bus may also be utilized while still conforming to the specification described herein.

1. Writes

Figure 5:
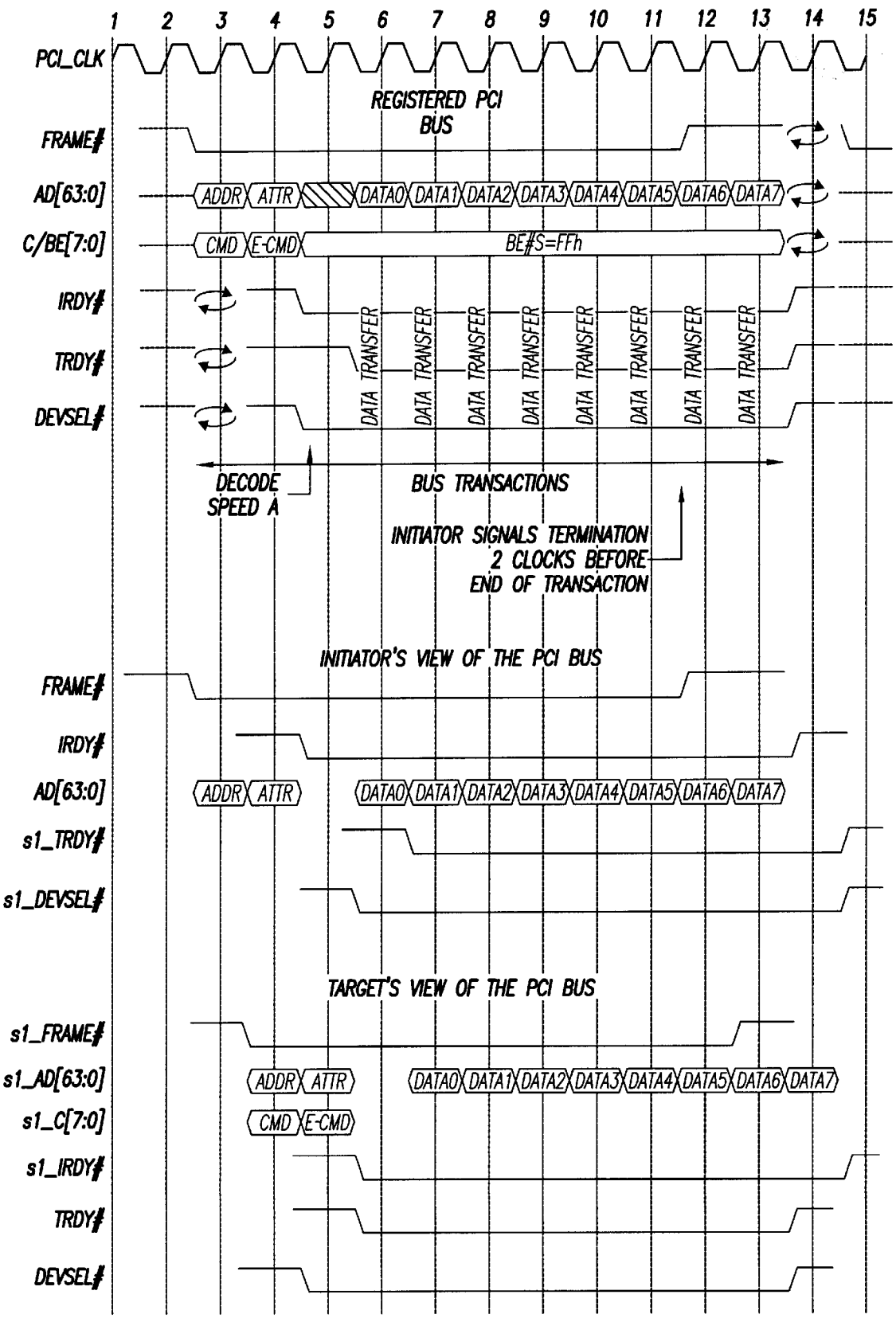
FIG. 5 is a schematic timing diagram of a byte-count write operation with no target initial wait states according to the present invention.
Figure 6:
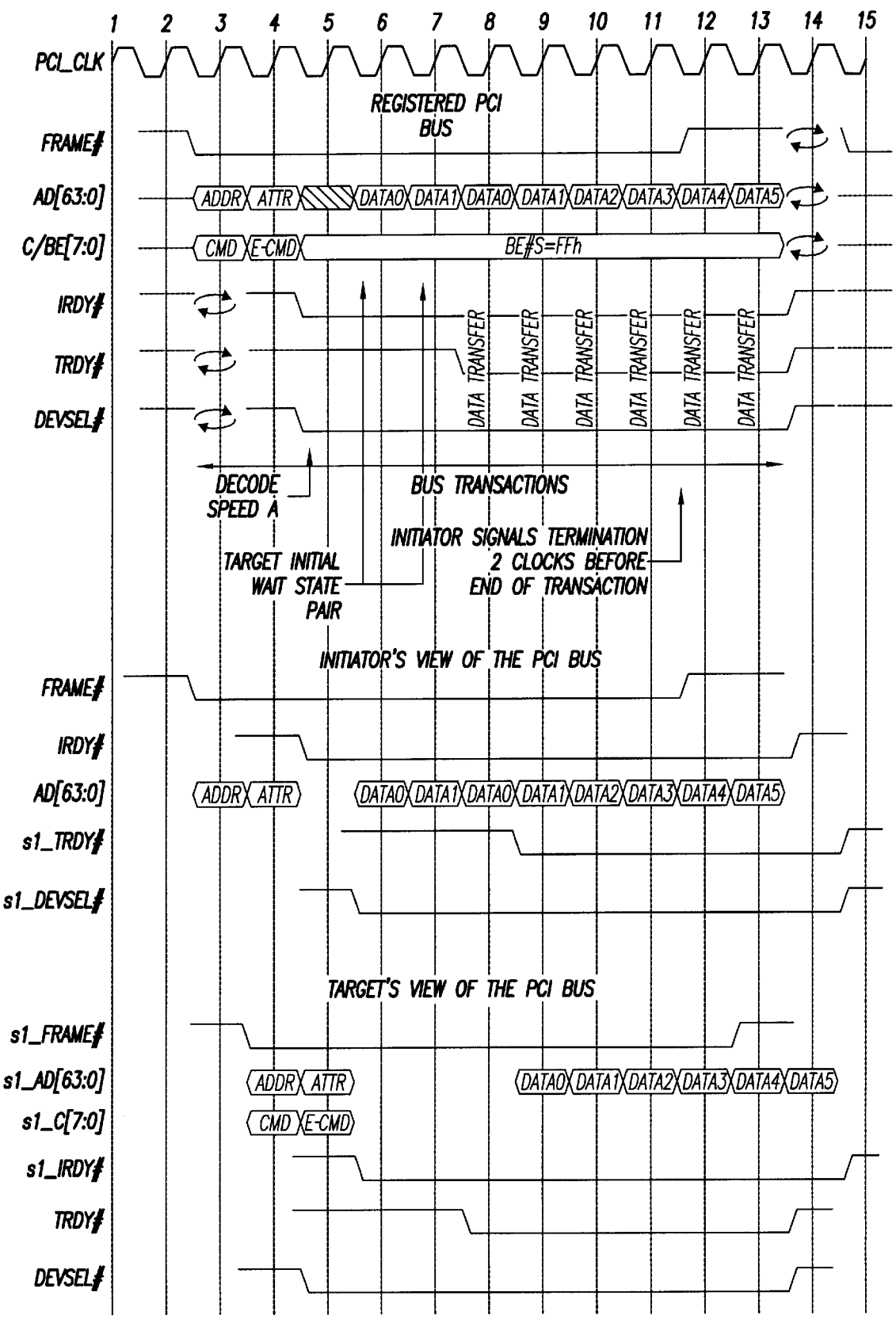
FIG. 6 is a schematic timing diagram of a byte-count write operation with target initial wait states according to the present invention.

Referring to FIGS. 5 and 6, byte-count write transactions are illustrated. The top portion of FIGS. 5 and 6 illustrate the signals as they appear on the bus. The middle and lower portions of the figure show the view of the PCI bus from the initiator and target, respectively. Signal names preceded by "s1_" indicate a signal that is internal to the device after the bus signal has been sampled. For example, the initiator asserts FRAME# on clock 3. The target samples FRAME#, so s1_FRAME# is asserted on clock 4. According to the present invention, the data is not required to be valid in the clock after the attribute phase of a write transaction (and a Split Completion). This clock could be used as a turn-around clock by multi-package host bridges that source the address from one package and the data from another.

FIG. 5 illustrates the minimum target initial latency of 3 clocks. At clock 5, data is not required to be valid, even with the assertion of IRDY# by the initiator. FIG. 6 illustrates a similar transaction to the one illustrated in FIG. 5, but with only 6 data phases and a target initial latency of 5 clocks and two initial wait states. In such a case, one or more wait states are required and the illustration of FIG. 6 happens to have two initial wait states. Notice at clocks 6 and 7 the initiator toggling between DATA0 and DATA1. This toggling starts once the initiator detects the target assertion of DEVSEL#, and continues until the initiator detects the target assertion of TRDY#, which does not occur until clock 8.

2. Reads

Figure 7:
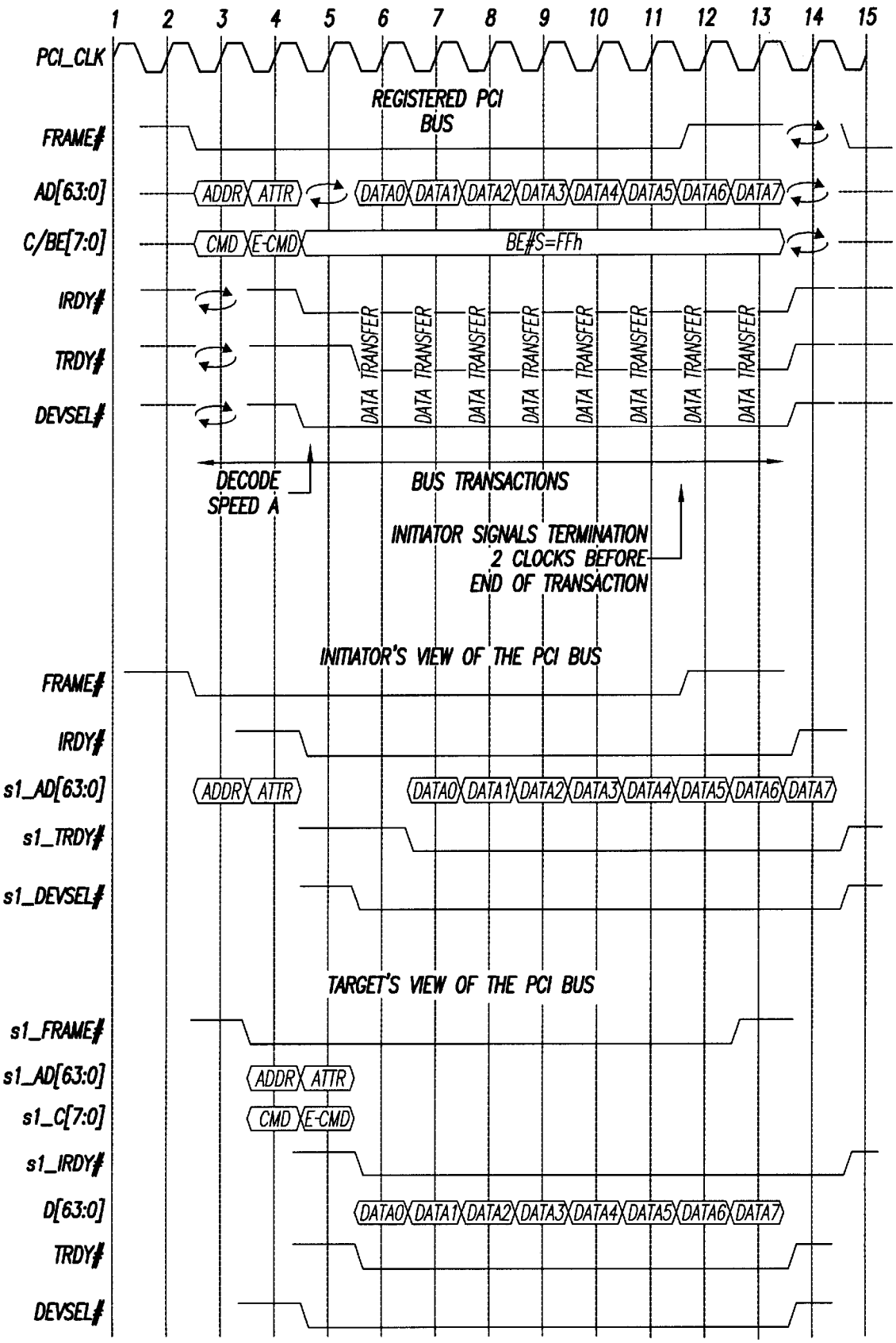
FIG. 7 is a schematic timing diagram of a byte-count memory-read transaction with no target initial wait states according to the present invention.
Figure 8:
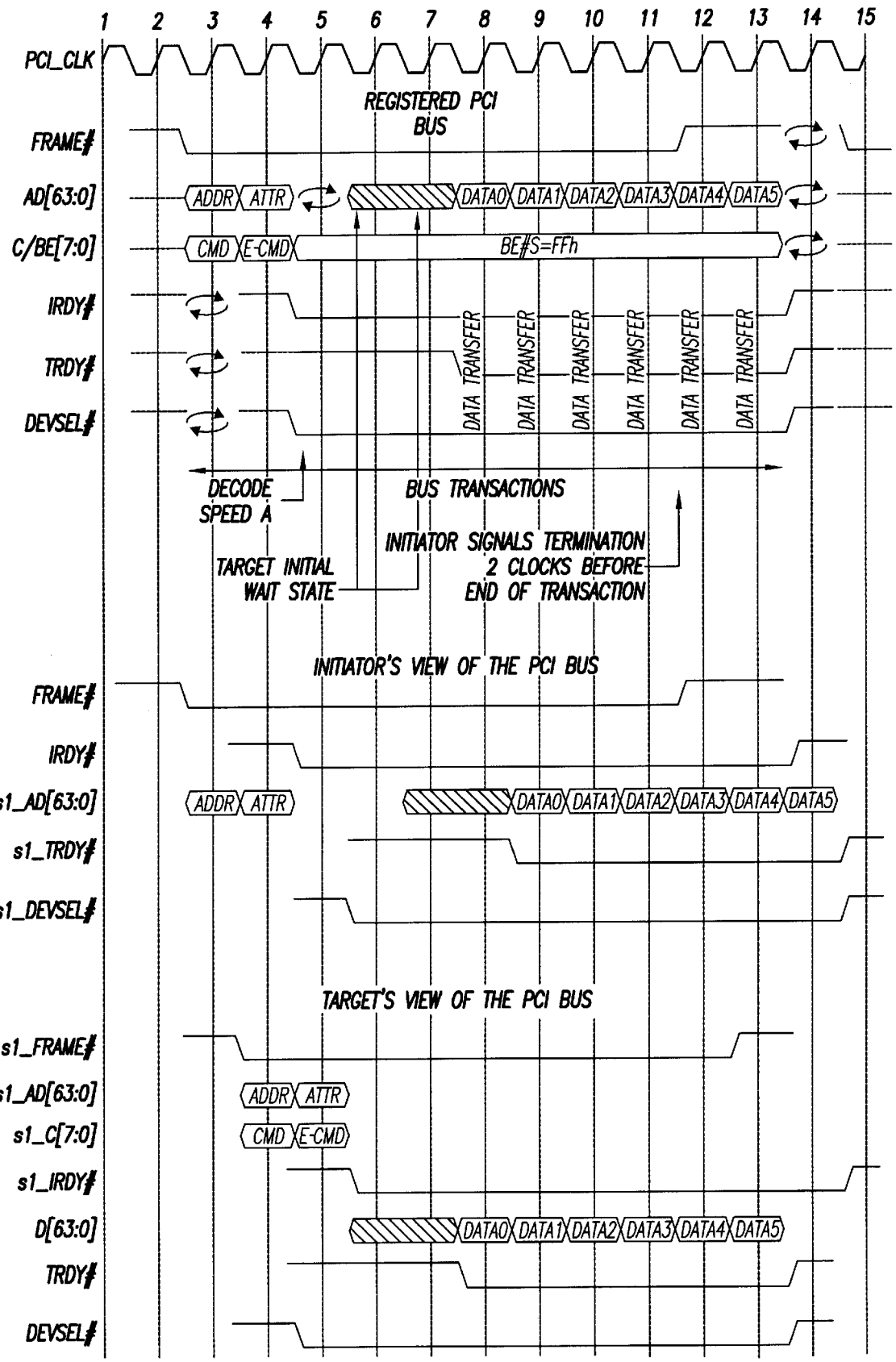
FIG. 8 is a schematic timing diagram of a byte-count memory-read transaction with target initial wait states according to the present invention.

Referring now to FIGS. 7 and 8, schematic timing diagrams of a byte-count memory-read transaction with no target initial wait states and a byte-count memory-read transaction with target initial wait states, respectively, are illustrated. FIG. 7 illustrates a byte-count read transaction with the minimum target initial latency of 3 clocks. The top portion of the diagram of FIG. 7 illustrates the signals as they appear on the bus. The middle and lower portions of the diagram of FIG. 7 illustrate the view of the PCI bus from the initiator and target, respectively. Signal names preceded by "s1_" indicate a signal that is internal to the device after the bus signal has been sampled. FIG. 8 illustrates a similar transaction to the one illustrated in FIG. 7, but with only 6 data phases and initial target latency of 5 clocks. As with write statements described earlier, one or more wait states are used to synchronize the transfer of information.

B. First Alternate Embodiment

The PCI-X bus is a multiplexed address and data bus. Consequently, the AD bus can be used only to transfer either address or data information but not both. In some applications, this could create a bottleneck because multiple addresses cannot be pipelined while the data is being transferred by another master on the bus. A first alternate embodiment of the present invention illustrated in FIG. 3a solves this problem by allowing the various PCI-X devices (310, 312, 314, and 316) to enqueue multiple requests on the PCI-X bus 318 and utilize a side-band address port 320. The side-band address port 320 enables the addresses to be separated from the data. This is accomplished by placing the address information on the side-band address port 320 while keeping the data information on the PCI-X bus 318. FIG. 4 illustrates a read transaction utilizing side-band address port 320 elements SBA[7:0] to contain the address information and PIPE# to enqueue the request. This first alternate embodiment of the present invention allows, for example, a second master to start another request while the current master is transferring its data. In this way, multiple random requests can be transferred on the PCI-X bus without waiting for the current cycle to complete. It will be understood, however, that fewer than eight side-band signals (SBA[7:0] mentioned above) may be utilized without departing from the spirit and scope of the present invention. The first alternate embodiment of the present invention can be useful of only two signal lines (the PIPE# and a single SBA signal line) are used.

C. Second Alternate Embodiment

Figure 3A:
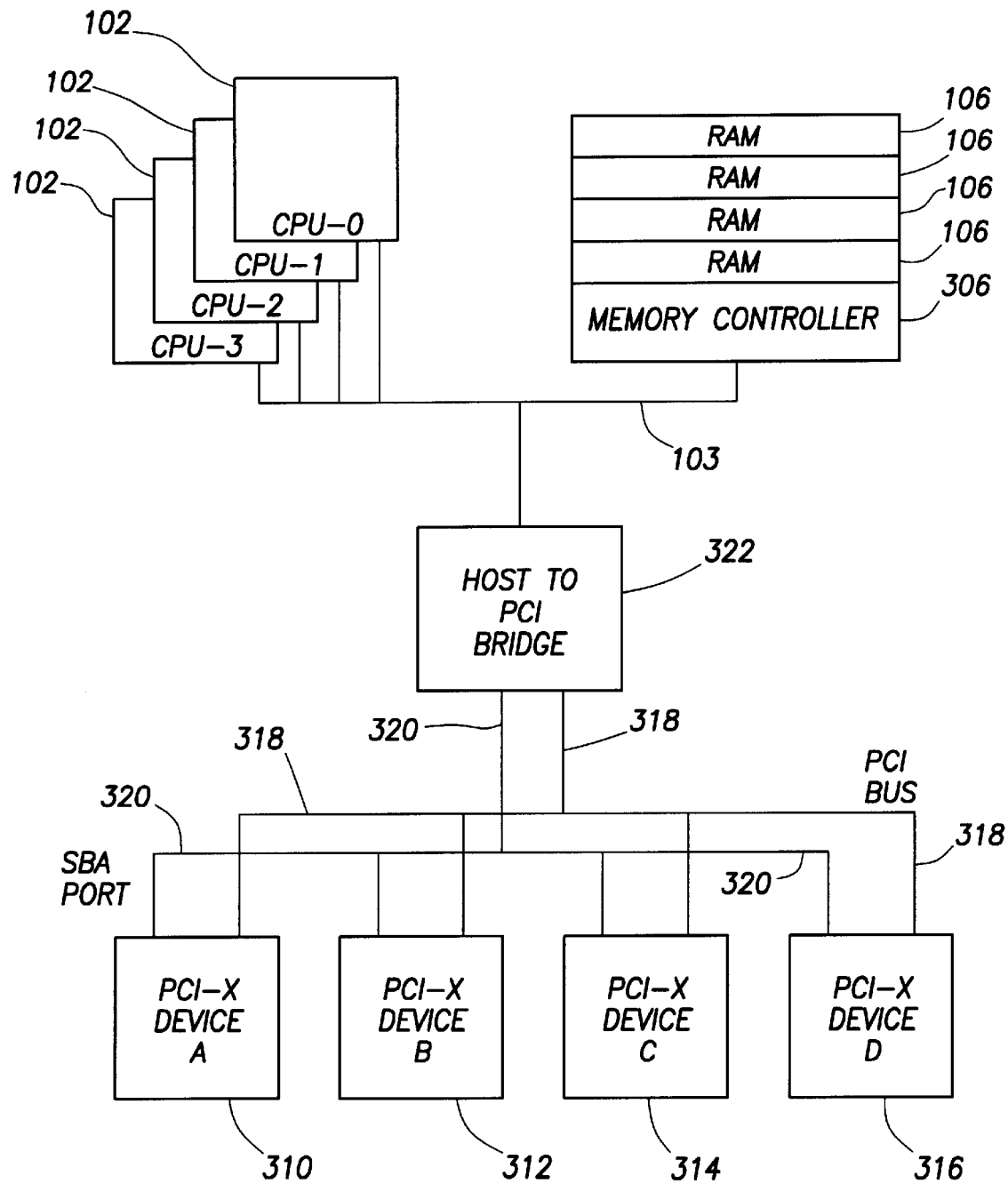
FIG. 3a is a schematic block diagram of a portion of a first embodiment computer system including PCI-X devices.
Figure 4A:
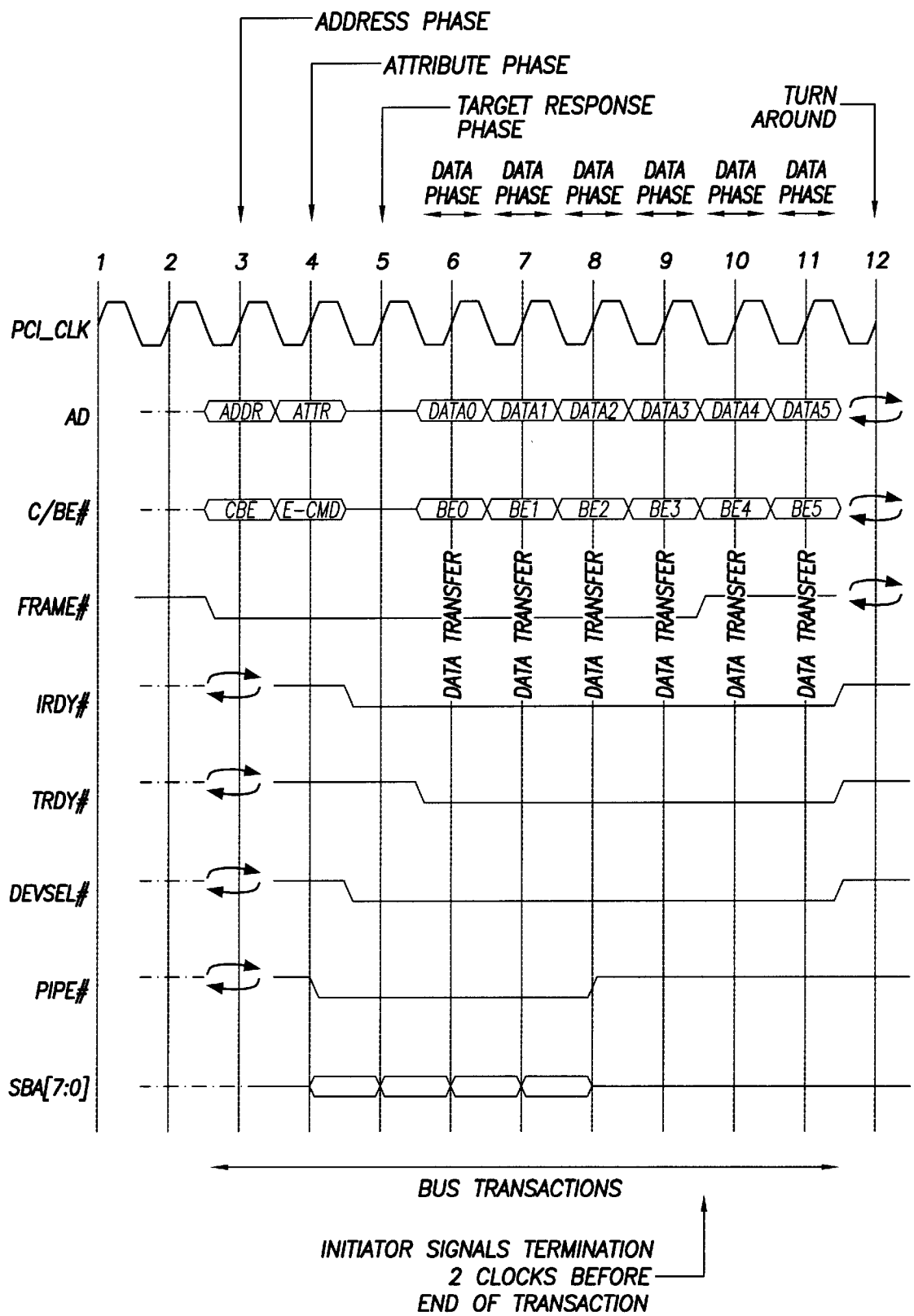
Figure 4B:
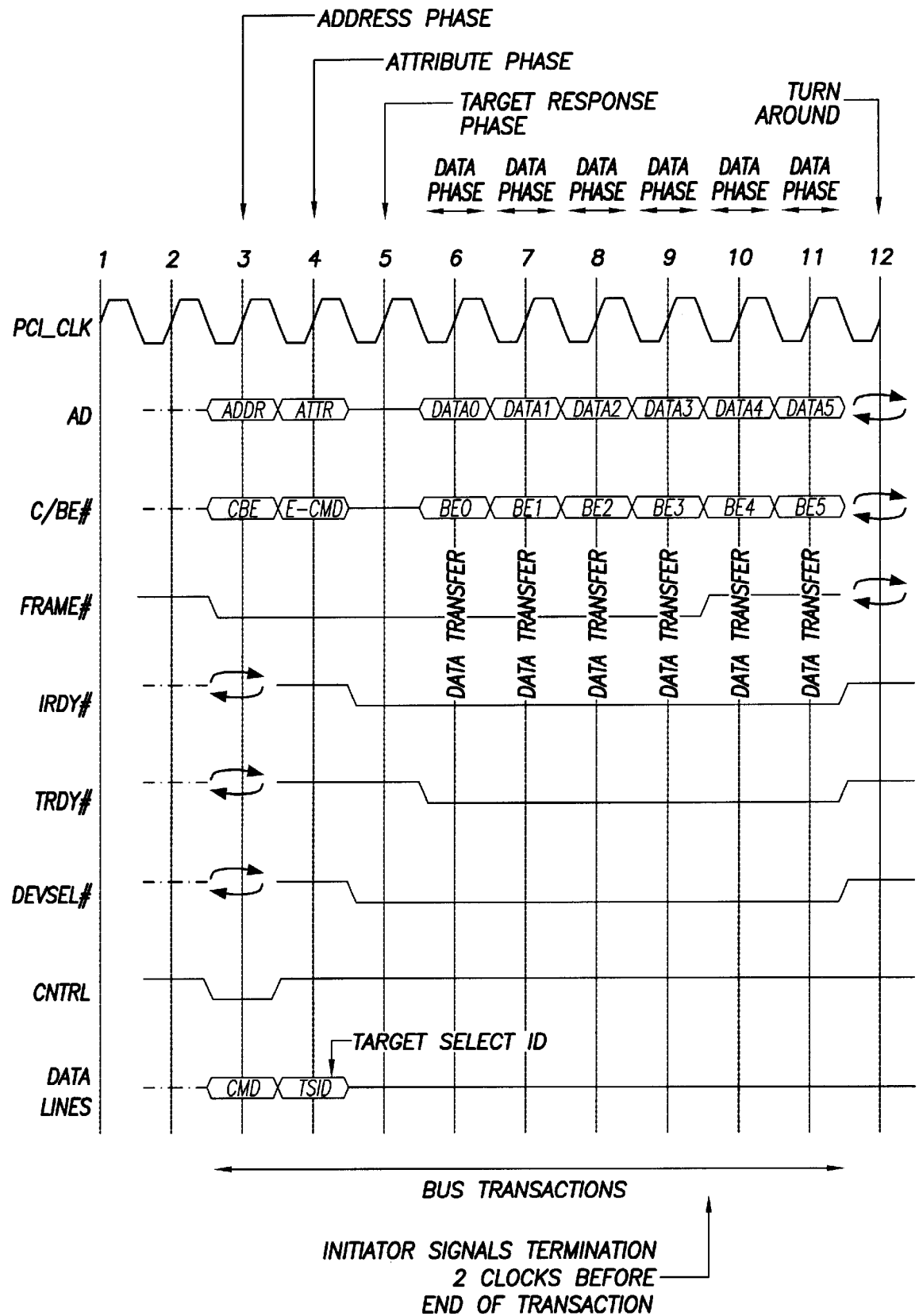
FIG. 4b is a schematic timing diagram of a byte-count count read operation of the computer system of FIG. 3b.

A second alternate embodiment of the present invention is illustrated in FIGS. 3a and 4a. Unlike the first alternate embodiment, the second alternate embodiment is directed to transactions with multiple targets. Most input/output buses, such as PCI-X and conventional PCI support only a single bus master with a single bus target. According to their respective specifications, neither PCI-X nor conventional PCI can broadcast the same data to multiple targets during the same bus transaction. In the prior art, such a broadcast required transferring the same data multiple times over the same bus—wasting both bandwidth and time. Commonly owned U.S. patent application Ser. No. 09/086,795, filed on May 28, 1998, discloses an apparatus and method that handles message/task load balancing among intelligent input/output ($I_2O$) devices. Commonly owned U.S. patent application Ser. No. 09/203,083, filed on or about Dec. 1, 1998, discloses a conventional PCI bus with five additional side-band signals. However, this second alternate embodiment of the present invention utilizes only two side-band signals, or, in yet another alternate embodiment, the extended command of the PCI-X protocol can be used to accommodate the multicast command.

Figure 3B:
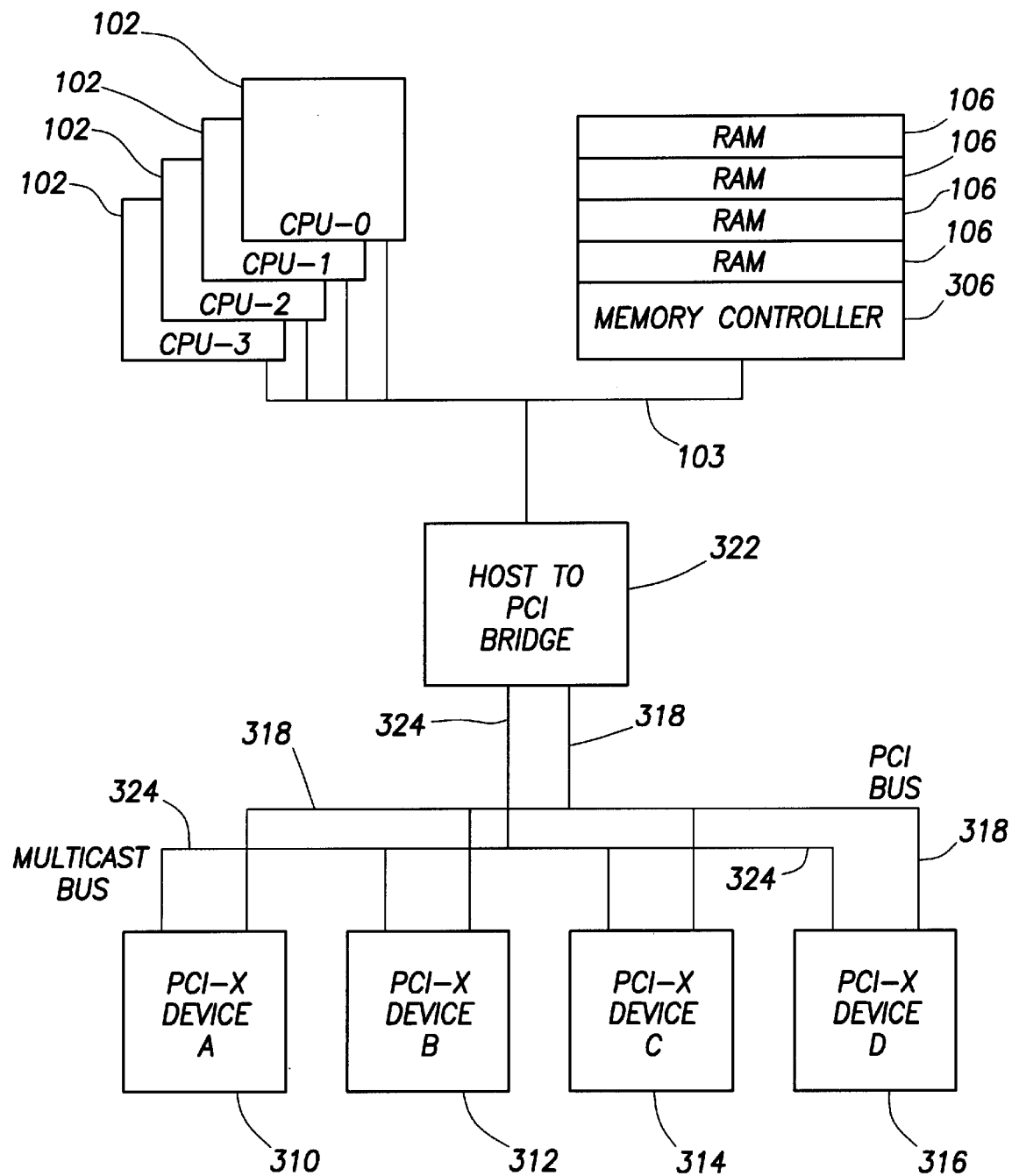
FIG. 3b is a schematic block diagram of a portion of a second embodiment computer system including PCI-X devices.

A description of the second alternate embodiment can be made with reference to FIG. 3b. As shown in FIG. 3b, PCI-X device 310 is an active PCI-X device. PCI-X device 312 is designated as a fail-over device in duplex configuration. In this configuration, the two PCI-X devices 310 and 312 are essentially identical. The computer system BIOS will set up the appropriate configuration registers inside the host-to-PCI bridge 322 upon startup. In operation, for example, when the host CPU 102 wants to write data to PCI-X device 310, the host-to-PCI bridge 322 will run both the side-band multicast bus 324 and the PCI-X bus 318 simultaneously to inform the PCI-X device 312 and the PCI-X device 310 to update with the data on the PCI-X bus 318 that was targeted to PCI-X device 310. Unlike the prior art, under this scenario, the second alternate embodiment of the present invention allows both PCI-X devices 310 and 312 to be updated simultaneously and the bus bandwidth consumption reduced by half. At a minimum, the multicast bus 324 consist of at least two signal lines, one for data and one for command and control. However, the bus can consist of N lines where N is the number of devices on the bus. In the preferred embodiment of the present invention, the multicast bus 324 consist of five signal lines; four of which are designated as data lines (for multiplexed command/data/request instructions) and one command/control ("CNTRL") line. FIG. 4a illustrates a typical write transaction utilizing the side-band signals (CNTRL and Data Lines) of the second alternate embodiment of the present invention.

In yet another alternate embodiment, the CNTRL line signal can be obviated entirely, leaving only one or more data line signals. The signal to transmit data lines over the side-band multicast bus 324 can be made during the extended command phase ("E-CMD") on the C/BE# bus as shown in FIG. 4a. However, specific E-CMD commands alerting multiple devices must observe the existing PCI-X extended command protocol and utilize only those commands that are currently reserved for that bus during the attribute phase of a PCI-X transaction.

A second example of the second alternate embodiment of the present invention can be illustrated again by reference to FIG. 3b. In this example, PCI-X device 310 is an active PCI-X device such as a disk controller. PCI-X device 312 is designated as a fast backup device such as a tape controller. Upon startup, the computer system BIOS will set up the appropriate configuration registers inside the host-to-PCI-X bridge 322. When the CPU 102 wants to write data into PCI-X device 310, the host-to-PCI-X bridge 322 will run both the side-band multicast bus 324 and the PCI-X bus 318 simultaneously to write the data on the PCI-X bus 318 to both the PCI-X device 310 (the original target) and the PCI-X device 312. Again, bandwidth consumption is halved over prior art methodologies. Moreover, the present scenario enables system administrators to perform near real-time backup of the computer system 100 without scheduling separate backup periods that require the server to be inactive or down. Yet more examples will be evident to those skilled in the art upon referral to this disclosure without departing from the spirit and scope of the same.

D. Third Alternate Embodiment

System performance is strongly dependent upon memory latencies and bandwidth. The memory (bus) controller handles memory bus arbitration for system memory. There are five possible requesters for the memory bus: read multiple cachelines, processor read, processor write, I/O write, I/O read and refresh. It should be noted, however, that write requests to system memory are posted or buffered internally. The memory controller will empty the write buffers when getting full or when no outstanding memory requests are pending. Partial writes (i.e., writes of less than one full cacheline) are converted into read-merge-write cycles.

The memory bus arbiter has a fixed set of priorities, with some exceptions. Generally, the priority is as follows (from highest to lowest priority):

1) Second Refresh request;
2) Read multiple cachelines;
3) Processor read (single cacheline) request;
4) Processor write request;
5) I/O read (single cacheline) request;
6) I/O write request; and
7) Refresh (for the first attempt).

Most multiprocessor systems employ cache memories. Therefore, most memory requests (unless specified as non-cacheable memory or no-snoop-required) must maintain cache coherency. In the prior art, if a PCI device wanted to access system memory, it first had to gain control of the PCI bus. Once the PCI device has gained control of the PCI bus, it then generated a read transaction to the host-to-PCI bridge. The host-to-PCI bridge then performed its standard arbitration task between the PCI read request and the needs of the system I/O bus before generating the read transaction on behalf of the requesting PCI device. This process was repeated if the amount to be transferred is greater than one (32-byte) cacheline of data. A disadvantage of the prior art was that more overhead and longer memory latencies were incurred—especially when the amount of data transferred was relatively large. The overhead was incurred because, potentially, read request may have had to go through several PCI buses before reaching the host-to-PCI bridge. In addition, the host-to-PCI bridge had to generate the same request on, for example, the I/O bus of a multiprocessor system.

The proposed PCI-X protocol of the present invention provides byte count information that can be used by the memory controller to optimize performance. By knowing—in advance—the exact number of cachelines requests, the memory controller can dynamically and optimally schedule the memory and optimally schedule the memory and snoop cycles appropriately. By using the byte count/cacheline count information, the memory controller can schedule the next subsequent memory transactions (of the same PCI-X command) without waiting to transact the next multiple cacheline read requests. The memory controller can issue several internal memory requests to several memory ports, if available, without waiting for the next ADS# or PCI read transactions. Because these addresses are sequential, the memory controller can take advantage of "page hit" cycles, and/or pipeline the memory cycles to further reduce memory latencies. This third alternate embodiment of the present invention is particularly useful for multiprocessor environments where the CPU's 102 continually snoop the bus in an effort to resolve data consistency and cache coherency issues. The memory controller can maintain the cache coherency by running the snoop cycles on the host buses and wait for the snoop responses. Moreover, while waiting for all data of a multiple cacheline read from memory, the memory controller can run the necessary snoop cycles concurrently on the host buses if needed.

Figure 15:
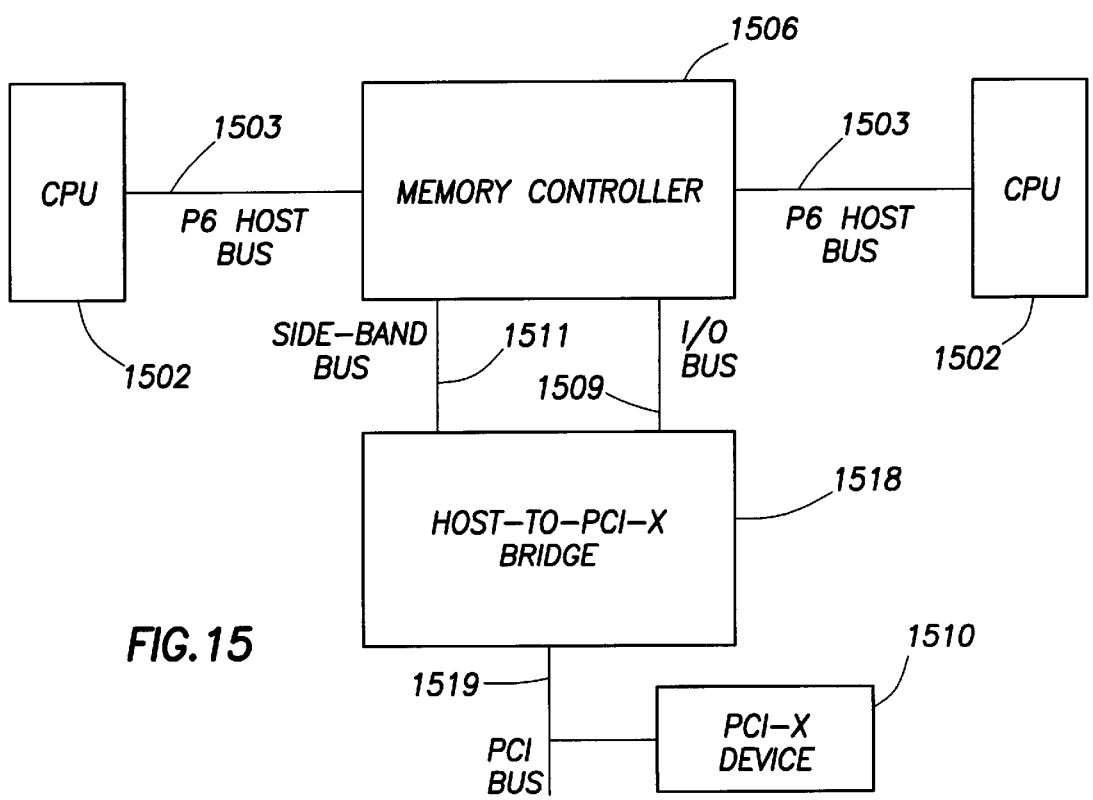
FIG. 15 is a schematic block diagram showing a memory controller with CPUs and a PCI-X device attached.

Reference is made to FIG. 15, wherein the CPUs 1502 contain local cache memory (commonly referred to as L2 cache). FIG. 15 shows two CPU's 1502 connected to a memory controller 1506 via a host bus 1503. A host-to-PCI-X bridge 1518 is connected to the memory controller 1506 by an I/O bus 1509, which may be similar or identical to the host bus configuration. The host-to-PCI-X bridge 1518 is also connected to the memory controller 1506 via a side-band bus 1511. Finally, a PCI-X device 1510 is connected to the host-to-PCI-X bridge 1518 via PCI bus 1519.

Figure 11:
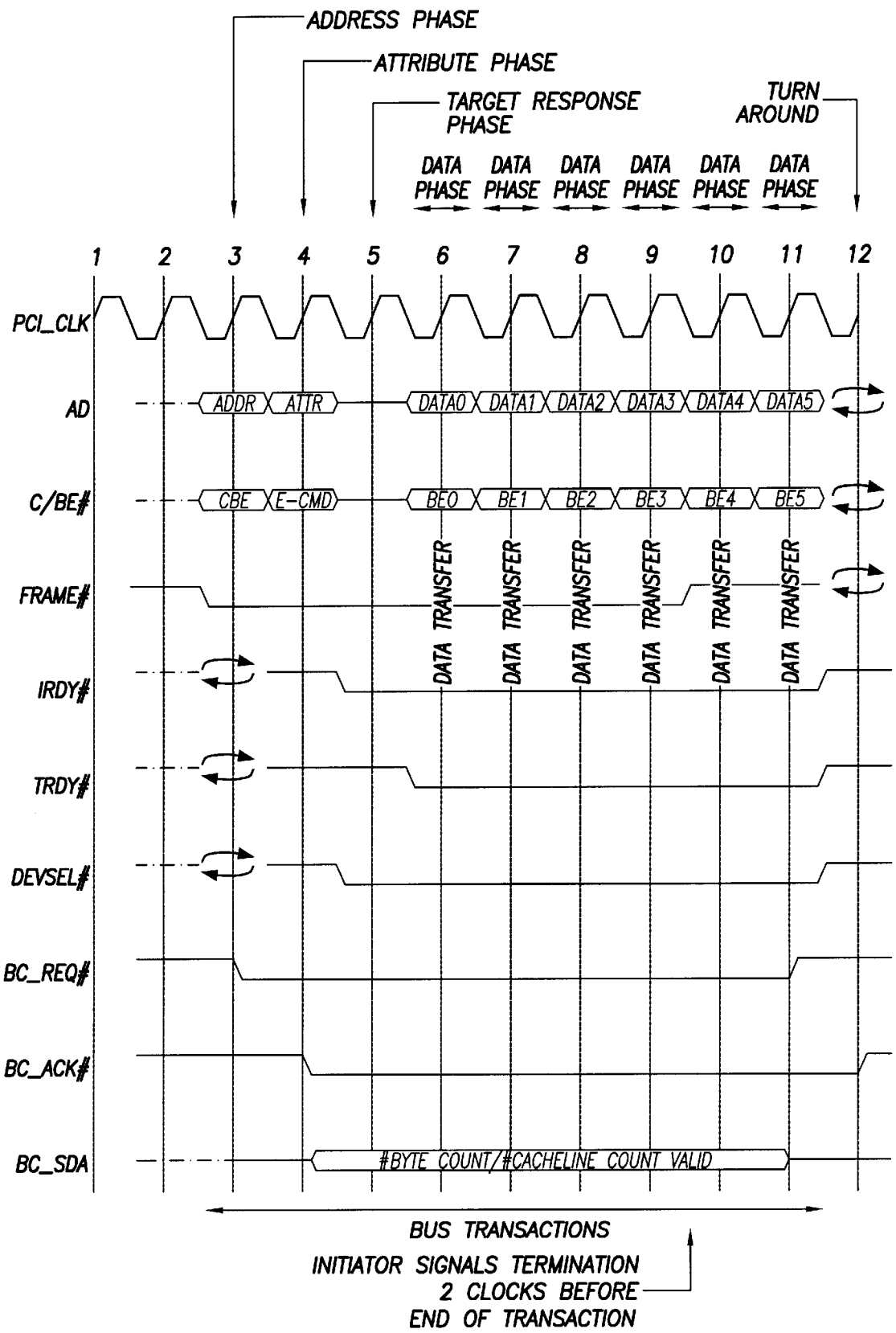
FIG. 11 is a schematic timing diagram of a byte-count read operation of an alternate embodiment of the present invention.

Essentially, with the third alternate embodiment, the memory controller continues to read more cachelines from main memory while the CPU's undergo the snoop cycles. This is accomplished in the following five steps. First, the byte count of the PCI-X transaction is transmitted to the memory controller. This first step can be accomplished by translating the byte count into a number of cachelines by the PCI-X bridge 1518 of FIG. 15 and transmitting it to the memory controller 1506. Alternatively, the byte count to cacheline count conversion could also be accomplished by the memory controller 1506 upon receiving the byte count from the host-to-PCI bridge 1518. However, it is preferred to handle the byte count/cacheline count conversion in the host-to-PCI-X bridge 1518 and transmit it to the memory controller 1506 via the BC_SDA side-band signal of the side-band bus 1511 as illustrated in FIG. 11. During the second step, the memory controller 1506 interprets the single byte count PCI-X transaction into multiple PCI cacheline read operations which the memory controller 1506 optimizes according to one or more optimization schemes. In the third step, the memory controller 1506, unless otherwise directed, initiates one or more snoop cycles on the P6 host bus 1503. However, once the snoop cycles have been initiated, the memory controller 1506 continues to execute the cacheline read operations and load data into an internal buffer. In the event of a write-back from one of the CPUs 102, the data in the buffer is abandoned and the memory controller 1506 handles the write-back from the CPU 102 in the normal manner in step four. However, in the more likely event that no write-back is initiated by a CPU 102, then the data read during a particular snoop cycle is valid and the deferred read commands are then executed with the data in the buffer and, if necessary, via additional cacheline read operations. The benefit of the third alternate embodiment is that, in the likely event that no write-back condition occurs, memory latency is reduced by at least one, and likely many more, clock cycles because the memory controller 1506 continued to read in data during the snoop cycles. Moreover, there is no downside to the third alternate embodiment because, if a write-back condition does occur, all data read by the memory controller 1506 would have to be abandoned in any case.

Figure 9:
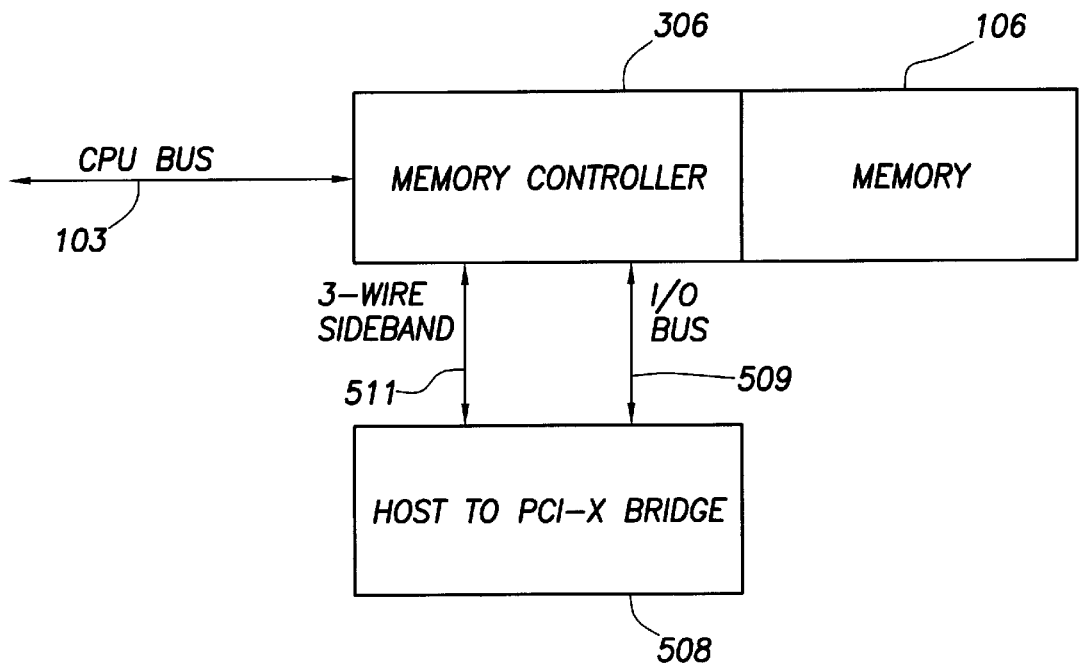
FIG. 9 is a schematic block diagram of a portion of a second embodiment computer system of the present invention.
Figure 10:
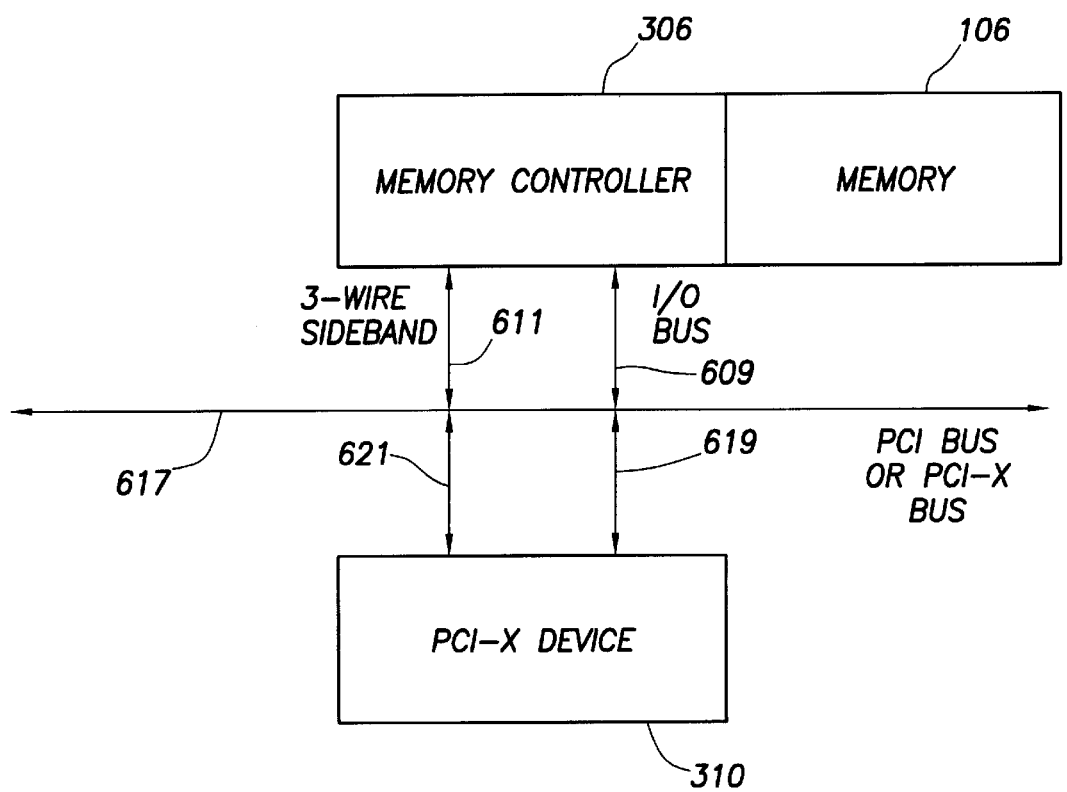
FIG. 10 is a schematic block diagram of a portion of a third embodiment computer system of the present invention.

The third alternate embodiment of the present invention is illustrated in FIGS. 9 and 10. The third alternate embodiment of the present invention contemplates a multiprocessor configuration, such as the presence of four Intel PENTIUM PRO processors in a symmetric multiprocessor configuration. It should be noted that, while the Intel PENTIUM PRO is within the preferred embodiment, the present invention will work with any microprocessor.

As shown in FIG. 9, the CPU's 102 (not shown) are connected to the memory controller 306 by CPU bus 103. The memory controller is directly connected to the system memory 106 as shown in FIG. 9. The host-to-PCI-X bridge 508 is connected to the memory controller 306 by the conventional input/output (I/O) bus 509. However, in the third alternate embodiment of the present invention, a three-wire side-band bus 511 also connects the memory controller 306 to the host-to-PCI-X bridge 508.

A slightly modified version of the third embodiment is shown in FIG. 10. In this instance, the memory controller 306 is connected directly to the PCI or PCI-X bus 617 via the I/O bus 609 and the three-wire side-band bus 611. Similarly, the PCI-X device 310 is also connected to the PCI/PCI-X bus 617 via connector 619 and side-band port 621. However, the side-band bus 611 and the PCI/PCI-X bus 617 behave as their counterparts of FIG. 9. As with the side-band bus of FIG. 9, the side-band bus of FIG. 10 contains at least one signal line, however it is preferred that there be three signal lines in the side-band buses 511, 611 and 621.

The three signal wires of the side-band bus 511 contain the BC_REQ# signal line, the BC_ACK# signal line and the BC_SDA signal line. These three lines are used for the byte/cacheline count protocol according to the third alternate embodiment of the present invention. A schematic timeline utilizing the three-wire side-band of the third embodiment is shown in FIG. 11. The BC_REQ# is driven by the requesting device (310 of FIG. 10) or the host-to-PCI-X bridge (508 of FIG. 9). If the memory controller 306 supports this feature, the BC_ACK# will be asserted low to indicate that it is ready to accept the byte/cacheline count information that is available to PCI-X byte count transactions from the requester. The byte/cacheline count information is transmitted via the SDA line(s) until the BC_REQ# is deasserted. The third alternate embodiment envisions a three-wire side-band bus 511, 611. However, if more SDA lines are needed, they can be added without departing from the spirit and scope of the present invention.

In certain specific computer system configurations, the three-wire side-band bus can be eliminated entirely in yet another alternate embodiment of the present invention. In this alternate embodiment, the specific computer system configuration requires the use of the Intel PENTIUM PRO ("P6") processor. The P6 happens to have reserved and still-unused command bit sequences in the CPU bus protocol. For a list of unused P6 commands, see the Pentium Pro specification that is available from the Intel Corporation, 2200 Mission College Blvd., Santa Clara, Calif. 95052-8119. One or more of the unused P6 commands can be utilized to do byte count data transfers and replies. Upon receiving the pre-designated unused (now utilized) P6 commands, the memory controller 306 will defer the read requests. The subsequent memory read data are transferred as multiple deferred replies with the same ID as the first read to the requested device.

Currently the PCI-X protocol supports a byte count of 12 bites. Therefore, the maximum transfer data size is 4K bytes. However, the third embodiment of the present invention enables the number of read requests on the PCI-X and P6 I/O buses to be reduced to one. The returning data can be in-order or out-of-order depending on the design tradeoffs between the memory controller 306 and the host-to-PCI-X bridge 508.

Instead of byte count information, cacheline count could be used because the memory controller 306 always handles memory transfer based on the fixed cacheline size, e.g., 32-byte or 64-byte. This will reduce the number of bits needed for byte counts from 12 bits to 7 bits or less in order to transfer data between two devices. Thus, the third embodiment of the present invention reduces memory latencies, bus overhead, and I/O bus utilization rates significantly when interfacing with PCI-X devices.

E. Fourth Alternate Embodiment

Registered PCI is an extension of the existing PCI standard for signaling and bus protocol that provides high-speed register-to-register transfer on the PCI bus. In PCI-X mode, all signals are sampled on the rising edge of the clock and only the registered version of these signals are used inside the device. The conventional PCI specification includes many cases where the state of an input signal setting up to a particular clock edge affects the state of an output signal after that same clock-pair boundary, which replaces some single-clock-edges where control signals change. Data phases still come one per rising clock edge, but once the Master and Target use IRDY# and DEVSEL# to identify the start of the first clock pair, control signals generally switch only on clock-pair boundaries.

Some compatibility with existing PCI systems and devices is critical to market acceptance of any enhancement like PCI-X. Consequently, PCI-X devices will, in many cases, power up in a 33 MHz, standard protocol mode. Only when all devices on a bus segment are capable of PCI-X mode will any device be configured to use the higher performance PCI-X mode. To increase the bus bandwidth, the bus can operate at higher frequency. However, the PCI bus is basically a multiplexed address and data bus in order to reduce the pin count. Therefore, it is an inherently inefficient bus compared to demultiplexed busses such as the one found in the Intel PENTIUM PRO and the accelerated graphics port ("AGP") buses.

The fourth embodiment of the present invention enables the PCI-X bus to perform pipelined bus transactions. The pipelined bus transactions are actually interleaved with conventional PCI transactions on the bus. However, only memory read and write bus operations that are targeted with the main memory 106 can be so pipelined. Other bus operations, such as input/output (I/O) read and write, are executed as normal PCI-X or PCI transactions.

The pipelined PCI-X transaction utilizes at least one side-band control signal. However, it is preferred to utilize multiple side-band control signals that are used in conjunction with the PCI/PCI-X signal set. The pipelined protocols are overlaid on the PCI bus or PCI-X bus at a time and in a manner that a PCI/PCI-X bus agent would view the bus as idle.

The additional side-band interface uses both PCI/PCI-X bus transactions without change. Both of these classes of transactions are interleaved on the same physical connection. The access request portion of a pipelined PCI-X transaction (bus command, address and burst length) is signaled differently than is a PCI/PCI-X address phase. The information is still transferred on the AD and C/BE# signals of the bus as is the case with PCI. However, the information itself is identified with a new control signal, PIPE#, in a way similar to the PCI address phases are identified with FRAME#.

When the bus is in an idle operation, the pipe can be started by inserting one or more PCI-X access requests consecutively. Once the data reply to those accesses starts, the stream can be broken or stopped by the bus master in order either to insert one or more additional PCI-X access requests or to insert a normal PCI or PCI-X transaction. This intervention by the bus master is accomplished with the bus ownership signals, REQ# and GNT#.

Figure 12:
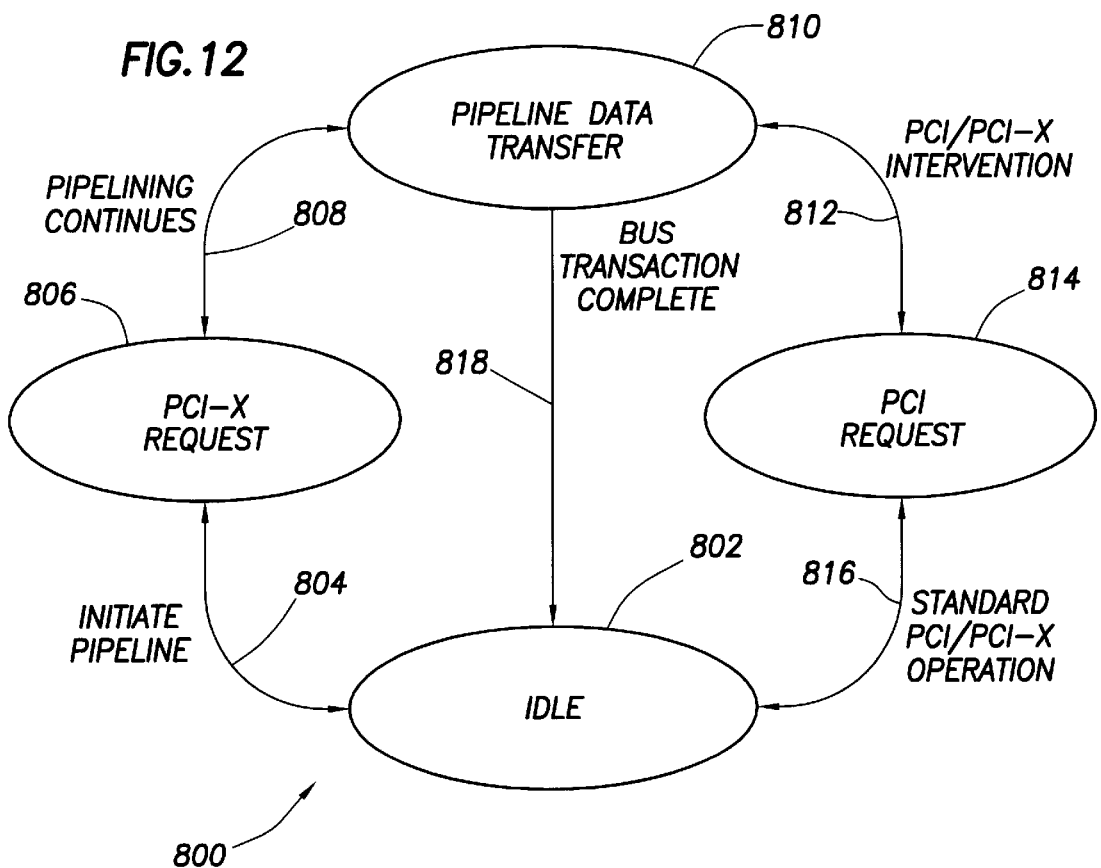
FIG. 12 is a flowchart diagram of the operation of an alternate embodiment of the present invention.

The operation of the fourth alternate embodiment of the present invention is illustrated in FIG. 12. The method 800 is begun when the bus is idle, step 802. Once idle, a pipelined command can be initiated, step 804. This pipelined command, and its attendant data, generates a PCI-X request in step 806. Once the PCI-X request has been made, the bus cannot immediately go back to the idle state. Pipelining continues onto step 808, after the PCI-X request has been made (in step 806). The pipelined data transfer then takes place in step 810. However, the process may be reversed to generate new PCI-X requests if necessary in step 806. Moreover, the simple transfer of data can result in a complete bus transaction 818, after which the bus will go back to the idle state 802. In unusual circumstances, however, the bus master may intervene in the PCI/PCI-X transaction, step 812. In that case, step 814 will occur and a PCI request will be generated. In some cases, a standard PCI/PCI-X operation will occur in step 816. It should be noted that the present methodology allows for step 816 to take place after step 802 (the bus being in an idle state and a PCI request being generated after a standard PCI/PCI-X operation). Moreover, after the PCI request 814 has been generated, the bus master may still invoke a PCI/PCI-X intervention, step 812 before the pipelined data transfer in step 810.

Figure 13:
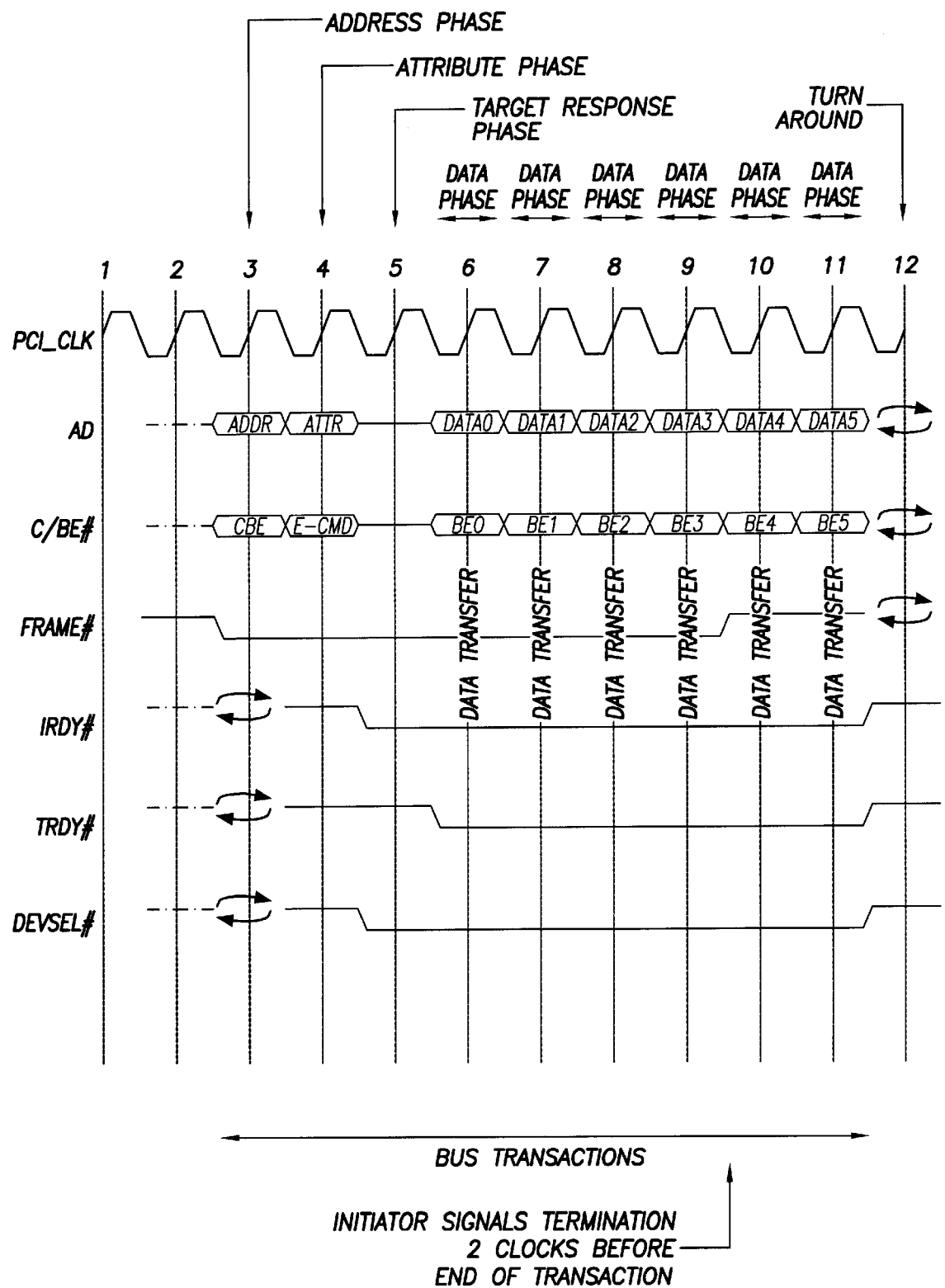
FIG. 13 is a schematic timing diagram of a byte-count read transaction of an alternate embodiment of the present invention.
Figure 14:
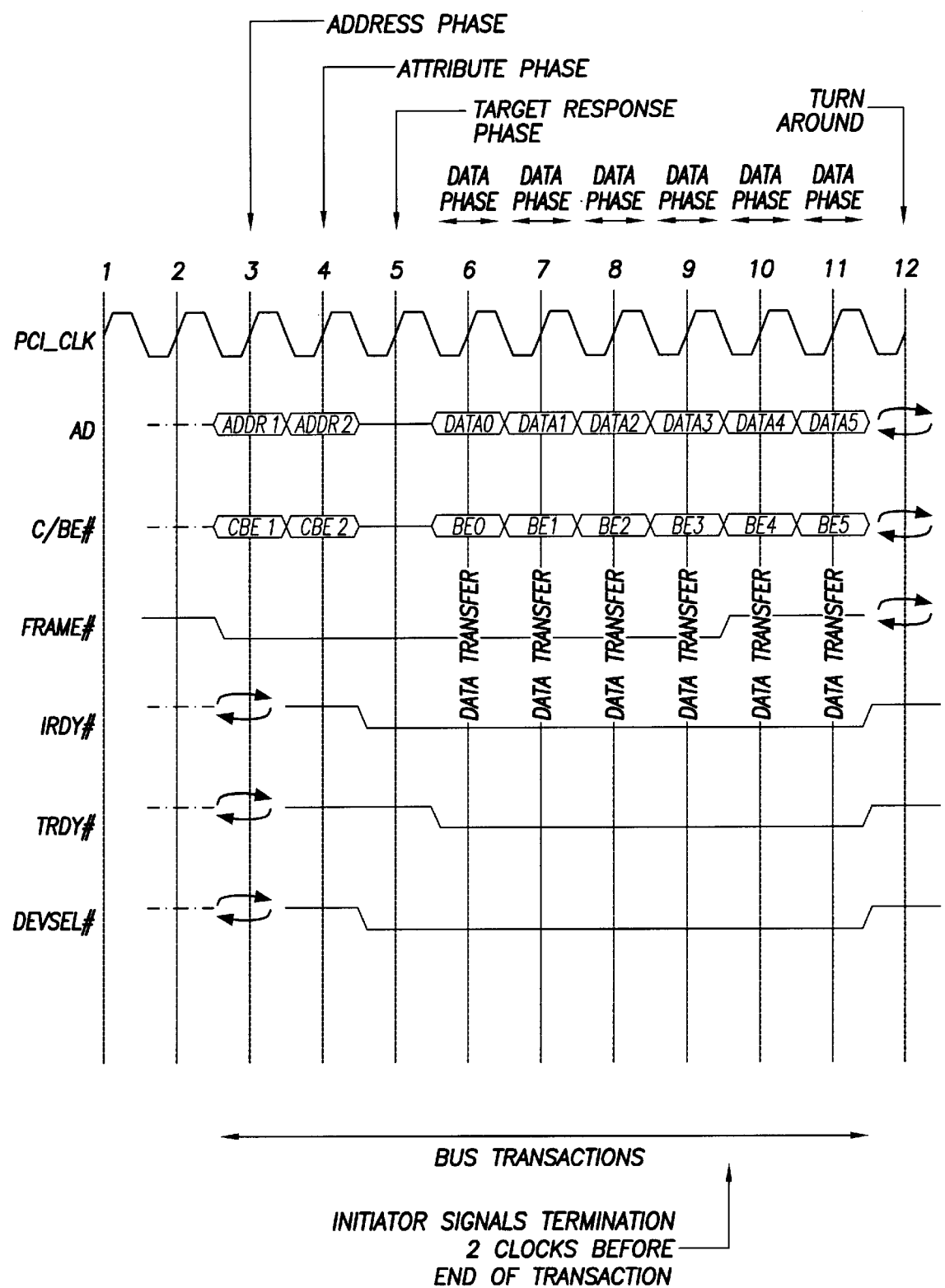
FIG. 14 is a schematic timing diagram of a byte-count read transaction of an alternate embodiment of the present invention.

A basic (non-pipelined) PCI-X write transaction is shown in FIG. 13. A pipelined PCI-X write transaction is shown in FIG. 14. Note the differences in the attribute phases between FIGS. 13 and 14. Specifically, the pipelined write transactions as shown in FIG. 14 incorporate a pipelined Addr signal (Addr 2) on the AD signal lines during the attribute phase of the PCI-X transaction. Similarly, pipelined commands (CBE 2) are issued on the C/BE# signal lines during the attribute phase as shown in FIG. 14. The benefits of the pipelined cycle versus the standard PCI-X write command is as follows. If the pipelined cycle is a read operation, the target (e.g., the memory controller) can start the read operation at least seven clock cycles earlier than the normal PCI/PCI-X operation. If the pipelined cycle is a write operation, then the data of the second write operation will be available on the bus at least one clock cycle earlier than a normal PCI/PCI-X transaction because the bus master does not have to perform back-to-back write cycles.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system, said system comprising:
a central processing unit connected to a host bus;
a random access memory connected to a system memory bus;
a peripheral component interconnect (PCI) bus, said PCI bus operating on a sequential series of clock cycles, said PCI bus capable of implementing PCI-X bus arbitration rules and bus width rules according to a PCI-X protocol;
a core logic chip set connected to said host bus, to said PCI bus, and to said system memory bus;
said core logic chip set configured as a first interface bridge between said host bus and said system memory bus, said core logic chip set further configured as a second interface between said host bus and said PCI bus, and said core logic chip set further configured as a third interface bridge between said system memory bus and said PCI bus; and
a PCI-X device connected to said PCI bus;
wherein said PCI-X device and said core logic chip set are capable of conducting a byte-count transaction, said byte-count transaction allowing said bridge to fetch an amount of data that is determined by a value encoded in said byte-count.

2. A computer system, said system comprising:
a central processing unit connected to a host bus;
a random access memory connected to a system memory bus;
a peripheral component interconnect (PCI) bus, said PCI bus operating on a sequential series of clock cycles, said PCI bus capable of implementing PCI-X bus arbitration rules and bus width rules according to a PCI-X protocol;
a core logic chip set connected to said host bus, to said PCI bus, and to said system memory bus;
said core logic chip set configured as a first interface bridge between said host bus and said system memory bus, said core logic chip set further configured as a second interface between said host bus and said PCI bus, and said core logic chip set further configured as a third interface bridge between said system memory bus and said PCI bus; and
a PCI-X device connected to said PCI bus;
said PCI-X device and said core logic chip set are capable of conducting a byte-count transaction;
wherein said byte-count transaction has an address phase followed by an attribute phase.

3. The computer system of claim 2, wherein said byte-count transaction is a read transaction.

4. The computer system of claim 2, wherein said byte-count transaction is a write transaction.

5. The computer system of claim 4, wherein said attribute phase is followed by a target response phase.

6. The computer system of claim 5, wherein said target response phase is followed by a data phase.

7. The computer system of claim 6, wherein an initiator signals for a termination of said transaction two clocks before the end of said transaction.

8. The computer system of claim 2, wherein a clock immediately after said attribute phase may be used as a turn-around clock by multi-package host bridges that source an address from one package and data from another package.

9. The computer system of claim 2, wherein said transaction has at least one wait state.

10. The computer system of claim 2, wherein
an AD portion of said PCI-X bus contains an address during said address phase;
a C/BE portion of said PCI-X bus contains a command during said address phase;
said AD portion of said PCI-X bus contains an attribute during said attribute phase; and
said C/BE portion of said PCI-X bus contains an extended command during said attribute phase.

11. A computer system, said system comprising
a central processing unit connected to a host bus;
a random access memory connected to a memory controller, said memory controller connected to said host bus;
a host to PCI bridge, said host to PCI bridge connected to said host bus;
a peripheral component interconnect (PCI) bus connected to said bridge, said PCI bus operating on a sequential series of clock cycles, said PCI bus capable of implementing PCI-X bus arbitration rules and bus width rules according to a PCI-X protocol;
a side band address (SBA) port connected to said bridge, said SBA port capable of accommodating address information of a PCI-X transaction; and
at least one PCI-X device connected to said PCI bus and to said SBA port;
wherein said PCI-X device, said bridge and said memory controller are capable of conducting a byte-count transaction, said byte-count transaction allowing said bridge to fetch an amount of data that is determined by a value encoded in said byte-count.

12. The computer system of claim 11, wherein said SBA port contains a PIPE# signal.

13. The computer system of claim 11, wherein said SBA port contains at least one SBA signal line, said SBA signal line containing said address information.

14. The computer system of claim 11, wherein said SBA port contains eight SBA signal lines SBA[7:0].

15. A computer system, said system comprising:
a central processing unit connected to a host bus;
a random access memory connected to a memory controller, said memory controller connected to said host bus;
a host to PCI bridge, said host to PCI bridge connected to said host bus;
a peripheral component interconnect (PCI) bus connected to said bridge, said PCI bus operating on a sequential series of clock cycles, said PCI bus capable of implementing PCI-X bus arbitration rules and bus width rules according to a PCI-X protocol;
a multicast bus connected to said bridge; and
at least one PCI-X device connected to said PCI bus and to said multicast bus;
wherein said PCI-X device, said bridge and said memory controller are capable of conducting a byte-count transaction.

16. The computer system of claim 10, wherein said extended command is used to convey a multicast command.

17. The computer system of claim 15, wherein said multicast bus is composed of two signals.

18. The computer system of claim 17, wherein one of said two signals is a CNTRL signal.

19. The computer system of claim 17, wherein one of said two signals is a Data Line signal.

20. The computer system of claim 15, wherein said multicast bus is composed of at least one Data Line signal.

21. The computer system of claim 15, wherein said multicast bus is composed of one CNTRL signal and four Data Line signals.

22. The computer system of claim 20, wherein a signal related to said multicast bus is broadcast on a C/BE bus of said PCI bus in the form of an extended command during an attribute phase of said PCI-X protocol.

23. A computer system, said system comprising:
at least two central processing units connected to a memory controller by a host bus, said central processing units each having a cache memory;
a host to PCI-X bridge, said bridge connected to said memory controller by an I/O bus and a side-band bus;
a peripheral component interconnect (PCI) bus connected to said bridge, said PCI bus operating on a sequential series of clock cycles, said PCI bus capable of implementing PCI-X bus arbitration rules and bus width rules according to a PCI-X protocol; and default
at least one PCI-X device connected to said PCI bus;
wherein said PCI-X device, said bridge and said memory controller are capable of conducting a byte-count transaction, said byte-count transaction allowing said bridge to fetch an amount of data that is determined by a value encoded in said byte-count.

24. The computer system of claim 20, wherein said bridge performs a byte-count to cacheline-count conversion during said byte-count transaction.

25. The computer system of claim 20, wherein said memory controller performs a byte-count to cacheline-count conversion during said byte-count transaction.

26. The computer system of claim 24, wherein a cacheline-count amount is transmitted to said memory controller along a BC_SDA signal of said side-band bus.

27. A method of performing a byte-count transaction on a computer system having at least one central processor unit having cache memory, said central processor unit connected to a memory controller by a host bus, a host-to-PCI-X bridge connected to said memory controller by an I/O bus and a side-band bus, and a PCI-X device connected to said bridge by a PCI bus, said method comprising the steps of:
(a) converting a byte-count contained in a PCI-X transaction into a cacheline-count in said host-to-PCI-X bridge;
(b) interpreting, by said memory controller, said cacheline-count as a series of cacheline read operations;
(c) if not precluded from initiating a snoop cycle, then initiating a snoop cycle by said memory controller with said central processing unit;
(d) during said step (c), continuing to read data from said host-to-PCI-X bridge; and
(e) if no write-back condition occurs, then writing said data read from said host-to-PCI-X bridge to said central processor unit.

28. A computer system, said system comprising:
at least two central processing units connected to a memory controller by a host bus, said central processing units each having a cache memory;
a host to PCI-X bridge, said bridge connected to said memory controller by an I/O bus and a side-band bus;
a peripheral component interconnect (PCI) bus connected to said bridge, said PCI bus operating on a sequential series of clock cycles, said PCI bus capable of implementing PCI-X bus arbitration rules and bus width rules according to a PCI-X protocol; and at least one PCI-X device connected to said PCI bus;

wherein said PCI-X device, said bridge and said memory controller are capable of conducting a byte-count transaction;

wherein said side-band bus has at least two signal lines.

29. A computer system, said system comprising:

at least two central processing units connected to a memory controller by a host bus, said central processing units each having a cache memory;

a host to PCI-X bridge, said bridge connected to said memory controller by an I/O bus and a side-band bus;

a peripheral component interconnect (PCI) bus connected to said bridge, said PCI bus operating on a sequential series of clock cycles, said PCI bus capable of implementing PCI-X bus arbitration rules and bus width rules according to a PCI-X protocol; and at least one PCI-X device connected to said PCI bus;

wherein said PCI-X device, said bridge and said memory controller are capable of conducting a byte-count transaction;

wherein said side-band bus has three signal lines.

30. A computer system, said system comprising:

at least one central processing unit connected to a memory controller by a CPU bus, said central processing unit;

system memory connected to said memory controller; and a host to PCI-X bridge, said bridge connected to said memory controller by an I/O bus and a side-band bus;

wherein said bridge and said memory controller are capable of conducting a byte-count transaction, said byte-count transaction allowing said bridge to fetch an amount of data that is determined by a value encoded in said byte-count.

31. The computer system of claim 20, wherein said side-band bus contains three signal lines.

32. A computer system, said system comprising:

at least one central processing unit connected to a memory controller by a CPU bus;

said memory controller connected to a PCI bus by an I/O bus and a side-band bus;

system memory connected to said memory controller; and a host to PCI-X bridge, said bridge connected to said PCI bus by an I/O bus and a side-band bus;

wherein said bridge and said memory controller are capable of conducting a byte-count transaction, said byte-count transaction allowing said bridge to fetch an amount of data that is determined by a value encoded in said byte-count.

33. The computer system of claim 20, wherein said side-band bus has at least one signal.

34. The computer system of claim 20, wherein said side-band bus has three signals.

35. The computer system of claim 2, wherein an AD portion of said PCI-X bus contains a first address during said address phase;

a C/BE portion of said PCI-X bus contains a first command during said address phase;

said AD portion of said PCI-X bus contains a second address during said attribute phase; and said C/BE portion of said PCI-X bus contains a second command during said attribute phase.

* * * * *